United States Patent
Battistini

(10) Patent No.: US 12,352,299 B2
(45) Date of Patent: Jul. 8, 2025

(54) CLAMP SYSTEM

(71) Applicant: Rikki Martin Battistini, Orange, CA (US)

(72) Inventor: Rikki Martin Battistini, Orange, CA (US)

(*) Notice: Subject to any disclaimer, the term of this patent is extended or adjusted under 35 U.S.C. 154(b) by 45 days.

(21) Appl. No.: 18/542,731

(22) Filed: Dec. 17, 2023

(65) Prior Publication Data
US 2025/0198435 A1 Jun. 19, 2025

(51) Int. Cl.
*F16B 2/06* (2006.01)
*A62C 13/78* (2006.01)
*F16M 13/02* (2006.01)

(52) U.S. Cl.
CPC .............. *F16B 2/06* (2013.01); *A62C 13/78* (2013.01); *F16M 13/022* (2013.01)

(58) Field of Classification Search
CPC .......... F16B 2/06; F16M 13/022; A62C 13/78
USPC .................................. 248/230.6, 689, 316.1
See application file for complete search history.

(56) References Cited

U.S. PATENT DOCUMENTS

| | | | | |
|---|---|---|---|---|
| 2,931,607 A | * | 4/1960 | McFarland | F16L 3/23 |
| | | | | 248/74.1 |
| 3,188,030 A | * | 6/1965 | Fischer | F16L 3/222 |
| | | | | 248/68.1 |
| 4,768,741 A | * | 9/1988 | Logsdon | E21F 17/02 |
| | | | | 248/230.8 |
| 5,150,865 A | * | 9/1992 | Miller | F16B 21/088 |
| | | | | 411/510 |
| 6,126,122 A | * | 10/2000 | Ismert | F16L 3/243 |
| | | | | 24/271 |
| 6,685,144 B1 | | 2/2004 | Wochnick | |
| 7,665,773 B2 | | 2/2010 | Jones et al. | |
| 8,146,826 B2 | * | 4/2012 | Biderman | G06F 16/48 |
| | | | | 235/472.01 |
| 9,835,277 B2 | | 12/2017 | Chiproot | |
| 11,316,267 B2 | | 4/2022 | Kaistha et al. | |
| 2006/0131465 A1 | | 6/2006 | Lynch, Jr. et al. | |
| 2007/0080265 A1 | | 4/2007 | Schaffer | |
| 2022/0195816 A1 | | 6/2022 | Bardo et al. | |

* cited by examiner

*Primary Examiner* — Todd M Epps
(74) *Attorney, Agent, or Firm* — Raymond Sun

(57) ABSTRACT

A clamp system has a holder, first and second boss pieces and a C-shaped spring clamp. The holder has a rear body with a curved rear surface, and flat outer surfaces extending from the opposite ends of the curved rear surface. Each boss piece has a flat inner surface, and an outer edge with an angled slit that defines an inward grip edge, with the flat inner surfaces of each boss piece clamping against one of the two flat outer surfaces of the rear body. The C-shaped spring clamp has opposite first and second ends, with each end of the C-shaped spring clamp having a plurality of teeth. One tooth from each set of plurality of teeth together define one set of engaging teeth which engage the corresponding angled slits from the first and second boss pieces.

8 Claims, 11 Drawing Sheets

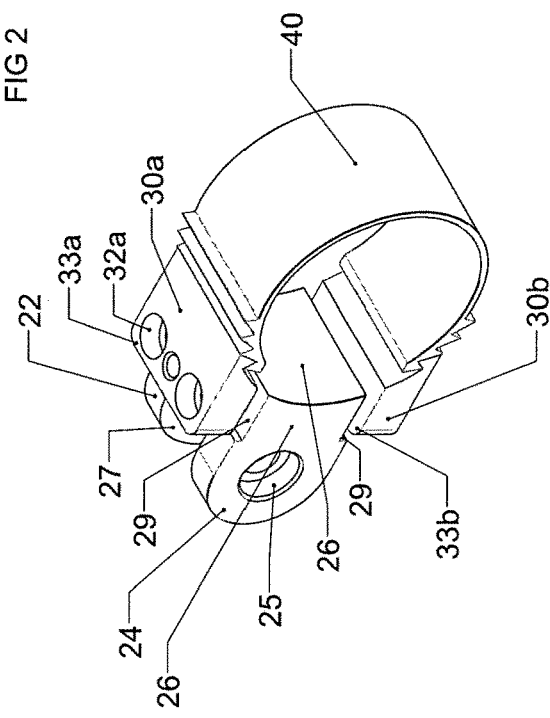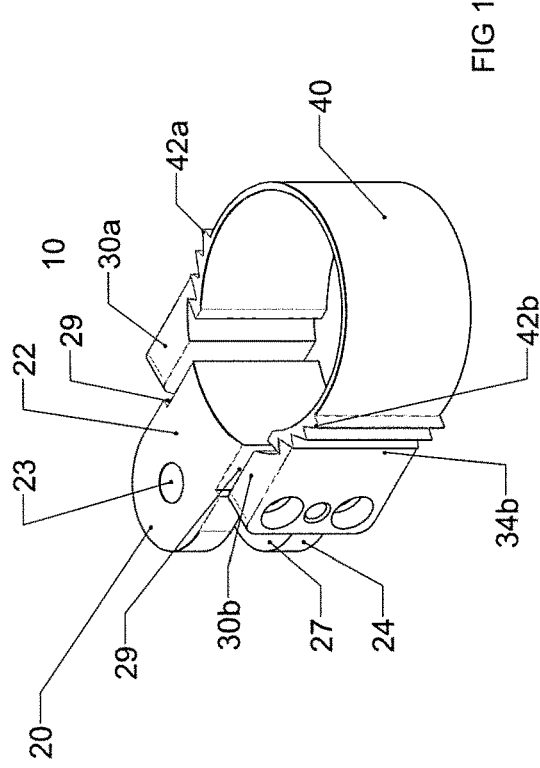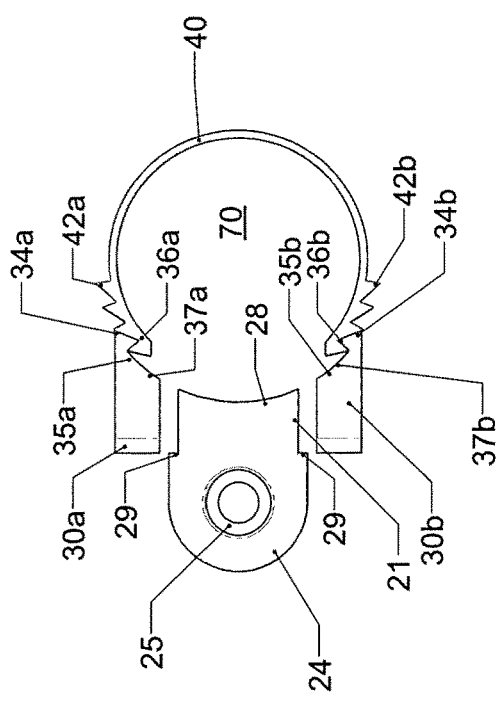

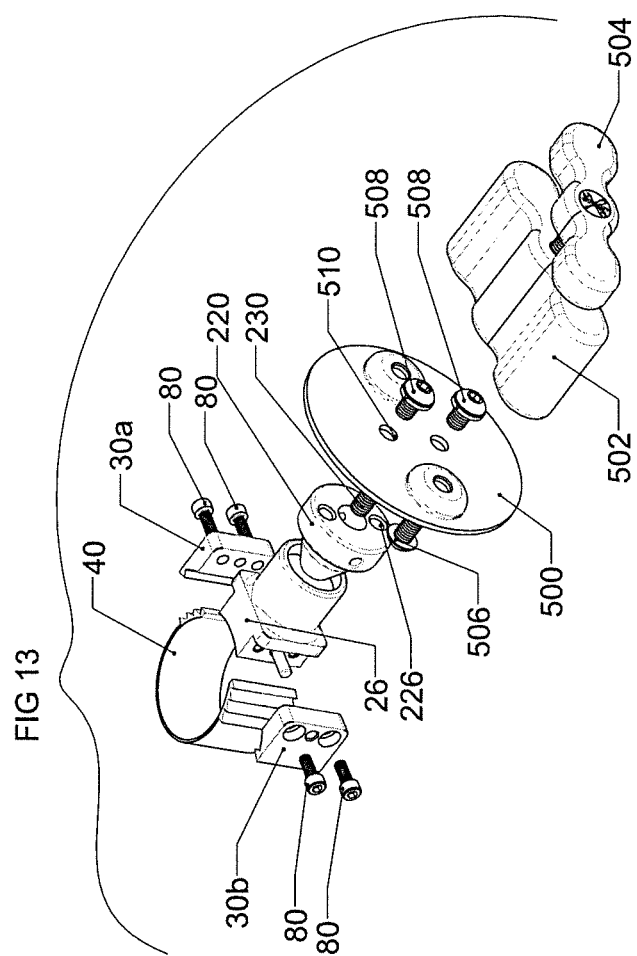

CLAMP SYSTEM

BACKGROUND OF THE INVENTION

1. Field of the Invention

The present invention is directed to a clamp system, and in particular, to a clamp system that is used to mount objects to a rounded bar or pipe.

2. Description of the Prior Art

Clamping devices are often used to mount objects to rounded bars or pipes. One example is the rounded bars on vehicles and motorcycles, where a user can mount mirrors or other objects on to the rounded bars. Unfortunately, in some of these applications, the rounded bars for different vehicles come in different diameter sizes, which make it difficult to secure objects on to these rounded bars.

Thus, there remains a need for a clamp system that allows objects to be conveniently mounted and secured to rounded bars having different diameters.

SUMMARY OF THE DISCLOSURE

One of the objects of the present invention is to provide a clamp system that allows objects to be conveniently mounted and secured to rounded bars having different diameters.

To accomplish the objectives set forth above, the present invention provides a clamp system having a holder, a first boss piece, a second boss piece and a C-shaped spring clamp. The holder has a rear body with a curved rear surface, and flat outer surfaces extending from the opposite ends of the curved rear surface. Each boss piece has a flat inner surface, and an outer edge with an angled slit that defines an inward grip edge, with the flat inner surfaces of each boss piece clamping against one of the two flat outer surfaces of the rear body. The C-shaped spring clamp has opposite first and second ends, with each end of the C-shaped spring clamp having a plurality of teeth. One tooth from each set of plurality of teeth together define one set of engaging teeth which engage the corresponding angled slits from the first and second boss pieces.

The clamp system of the present invention can be used with any vehicle, including but not limited to cars, motorcycles, side-by-sides, ATVs, UTVs and boats. It can also be used with any framework and garden structures. The clamp system of the present invention allows any fixed object to be secured to a rounded bar of almost any diameter in a manner where the clamp can be opened up to slide over the rounded bar and then be tightened without the need for removing the bar or the object, or any other item that would otherwise restrict the clamp from being fitted in place.

BRIEF DESCRIPTION OF THE DRAWINGS

FIG. 1 is an exploded top perspective view of a clamp system according to one embodiment of the present invention.

FIG. 2 is an exploded side perspective view of the clamp system of FIG. 1.

FIG. 3 is an exploded top view of the clamp system of FIG. 1.

FIG. 13 is an exploded rear perspective view of FIG. 12.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 4:
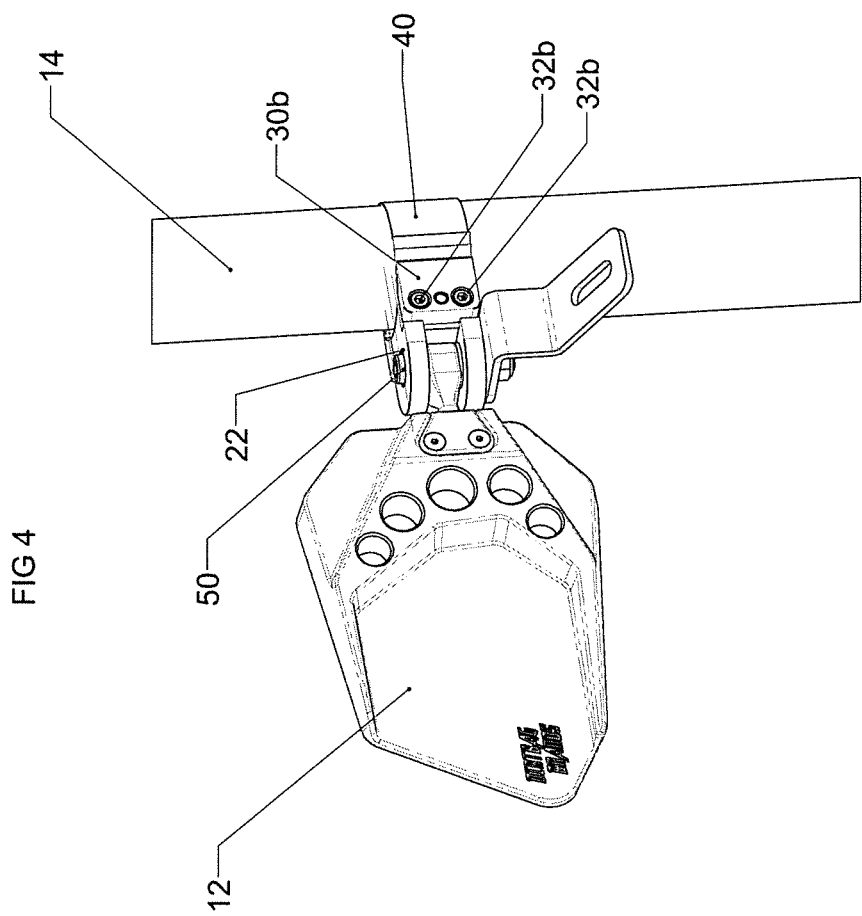
FIG. 4 is a perspective view showing the clamp system of FIG. 1 in use holding a side mirror to a rounded tube.
Figure 5:
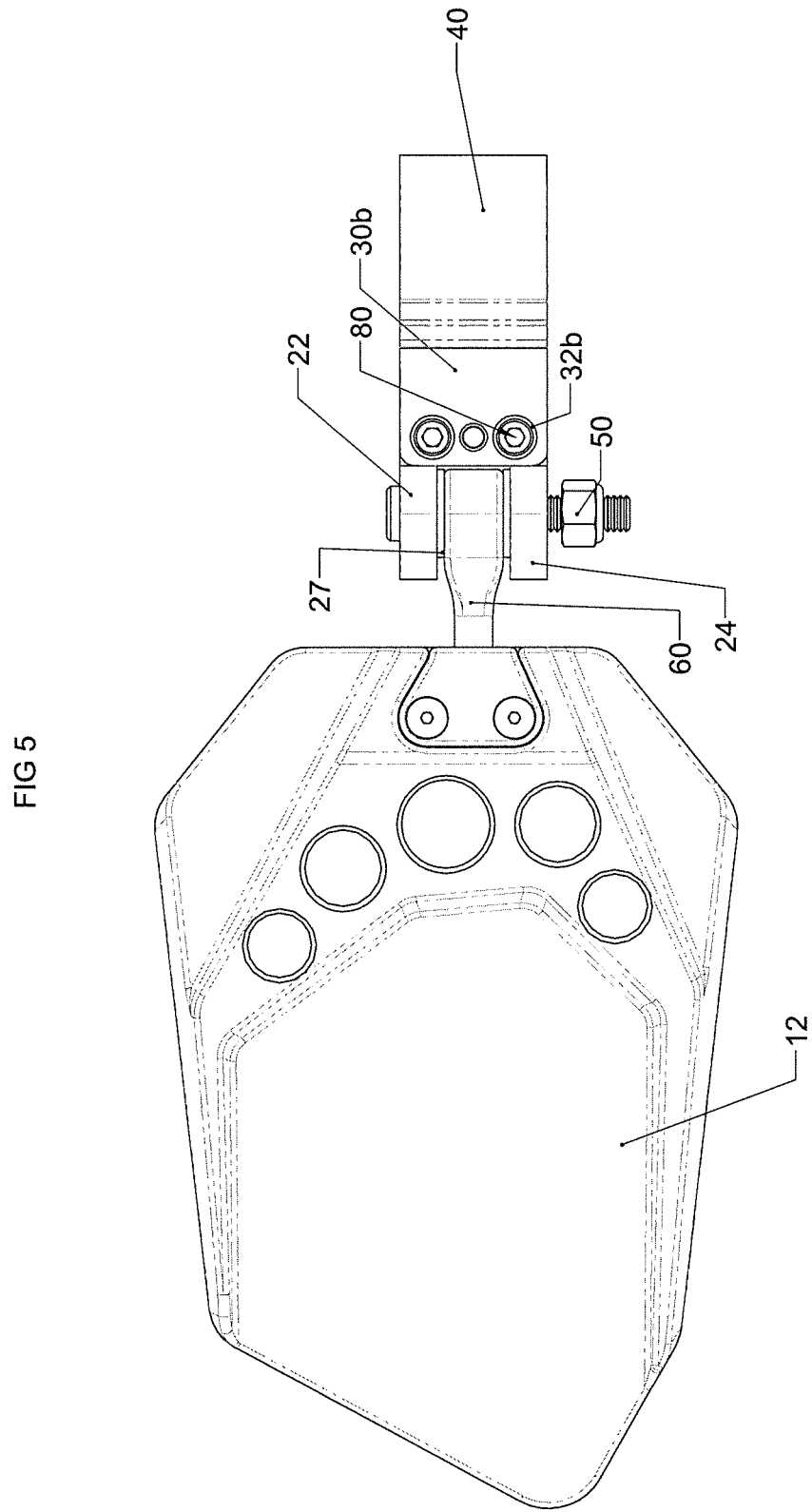
FIG. 5 is a front view showing the clamp system of FIG. 1 in use holding a side mirror.
Figure 6:
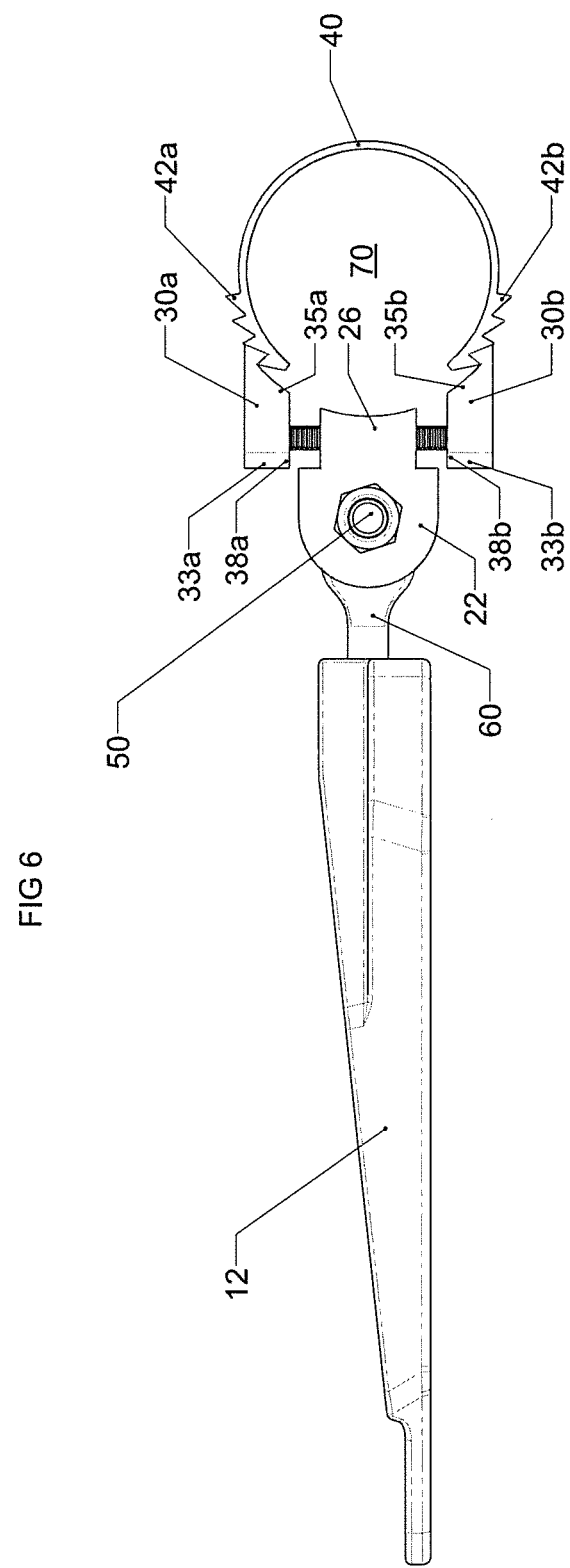
FIG. 6 is a top view of FIG. 5.
Figure 7:
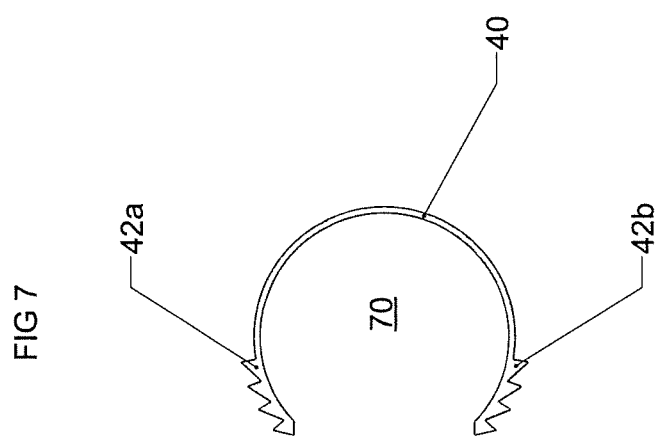
FIG. 7 is a top view of the spring clamp of the clamp system of FIG. 1.

The clamp systems of the present invention can be used for clamping objects to a round tube or bar 14. See FIGS. 4-6. The object 12 that is illustrated in this disclosure is a side mirror 12, although the object 12 can be almost any object in any environment that can be clamped or otherwise secured to a rounded tube or bar.

FIGS. 1-7 illustrate a clamp system 10 according to a first embodiment of the present invention. The clamp system 10 has a holder 20, a boss and a spring clamp 40.

The holder 20 has a first jaw 22 and a second jaw 24 that are connected by a rear body 26 to form a unitary generally C-shaped structure with a receiving space 27 therebetween. A stepped shoulder 29 is defined at the connection between each jaw 22 and 24 and the flat outer surfaces 21 of the rear body 26 such that the rear body 26 has a smaller width than the width between the outer surfaces of the jaws 22 and 24. Each jaw 22 and 24 can have a rounded configuration, and each jaw 22 and 24 has an opening 23 and 25, respectively, that is adapted to receive a bolt 50 (see FIGS. 4-6). The receiving space 27 is adapted to receive and secure a mounting handle 60 of the object 12. The mounting handle 60 preferably includes a bore that allows the bolt 50 to extend therethrough so as to allow the bolt 50 to secure the mounting handle 60 in the receiving space 27 between the jaws 22 and 24. The rear body 26 has a curved rear surface 28, with each flat outer surface 21 extending from opposite ends of the curved rear surface 28.

The boss is made up two separate boss pieces 30a and 30b. Each boss piece 30a, 30b has a plurality of holes 32a, 32b along an inner edge 33a, 33b, with the holes 32a, 32b aligned with corresponding holes (not shown in this embodiment, but see 262 in FIGS. 8 and 9) that extend through the rear body 26. Bolts 80 can extend through the holes 32a, 32b and the holes in the rear body 26 to secure the boss pieces 30a and 30b to the rear body 26. The outer edge 34a, 34b of each boss piece 30a, 30b defines an angled slit 35a, 35b with an inward grip edge 36a, 36b. A curved surface 37a, 37b extends from the grip edge 36a, 36b towards a flat inner surface 38a, 38b (see FIG. 6).

The spring clamp 40 is made of a flexible and springy material, such as aluminum or plastic, and is generally C-shaped. At each opposite end, the spring clamp 40 has a plurality of outwardly facing teeth 42a and 42b, with each set of teeth 42a, 42b adapted to engage the corresponding angled slit 35a, 35b.

The C-shaped configuration of the spring clamp 40, together with the curved surfaces 37a, 37b and the curved rear surface 28, define a generally circular receiving space 70 that is adapted for receiving and gripping the round tube 14. When the boss pieces 30a, 30b are clamped against the rear body 26, the corresponding flat surfaces 21 and 38a, 38b ensure a tight fit, with the shoulders 29 acting as stop surfaces.

In particular, the size of the receiving space 70 can be adjusted by pressing the spring clamp 40 more tightly against the rounded tube 14 so that a different set of teeth 42a, 42b engage the corresponding angled slit 35a, 35b. In other words, the different sets of teeth 42a, 42b on a spring clamp 40 that exhibits flexibility and resiliency interlocking with the angled slits 35a, 35b allow the grip of the spring clamp on the rounded tube 14 to be adjusted so as to ensure a tight and secure grip. This arrangement allows any fixed object to be secured to a rounded bar of almost any diameter in a manner where the spring clamp 40 can be opened up to slide over the rounded bar and then be tightened without the need for removing the bar or the object, or any other item that would otherwise restrict the spring clamp 40 from being fitted in place.

Figure 8:
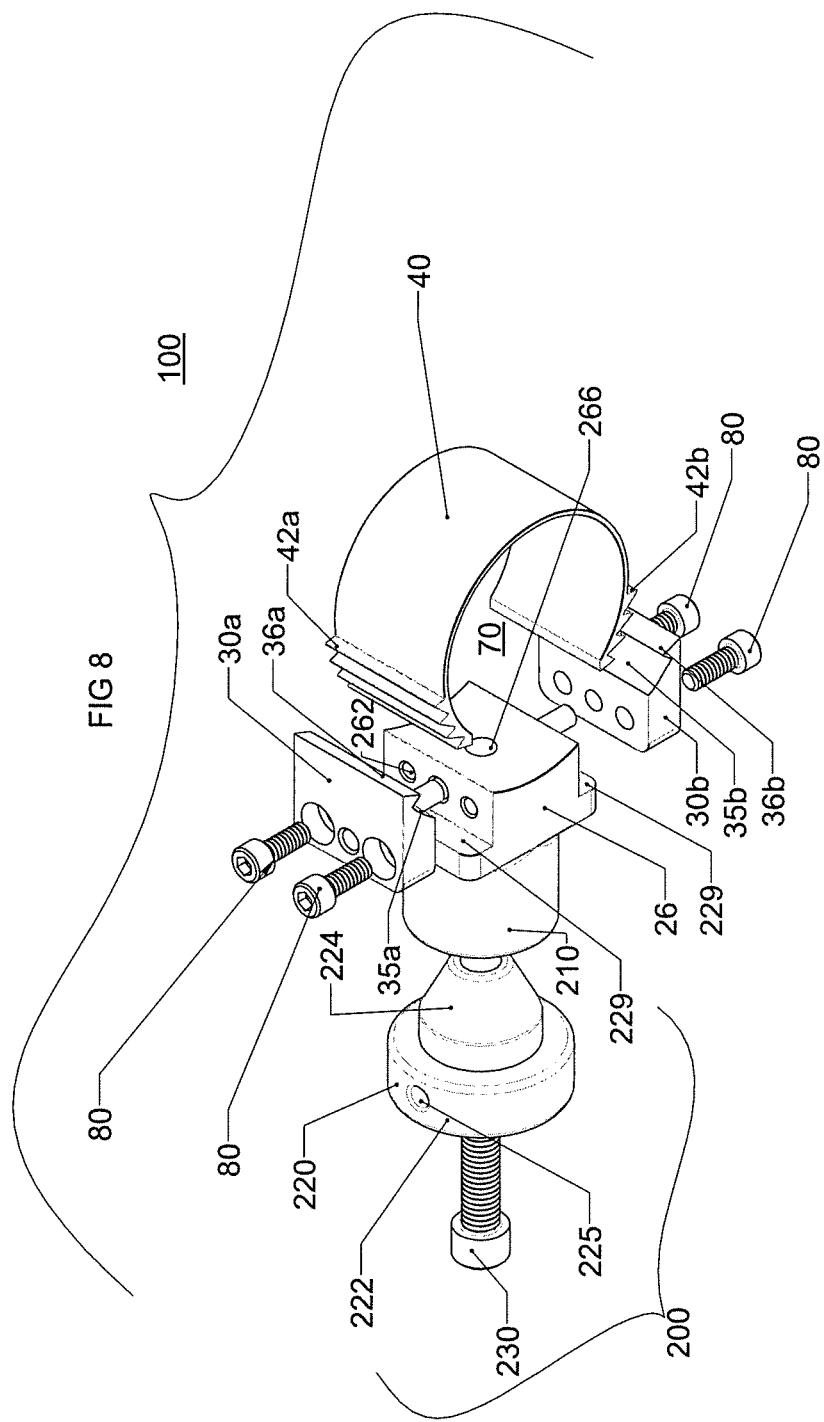
FIG. 8 is an exploded side perspective view of a clamp system according to another embodiment of the present invention.
Figure 9:
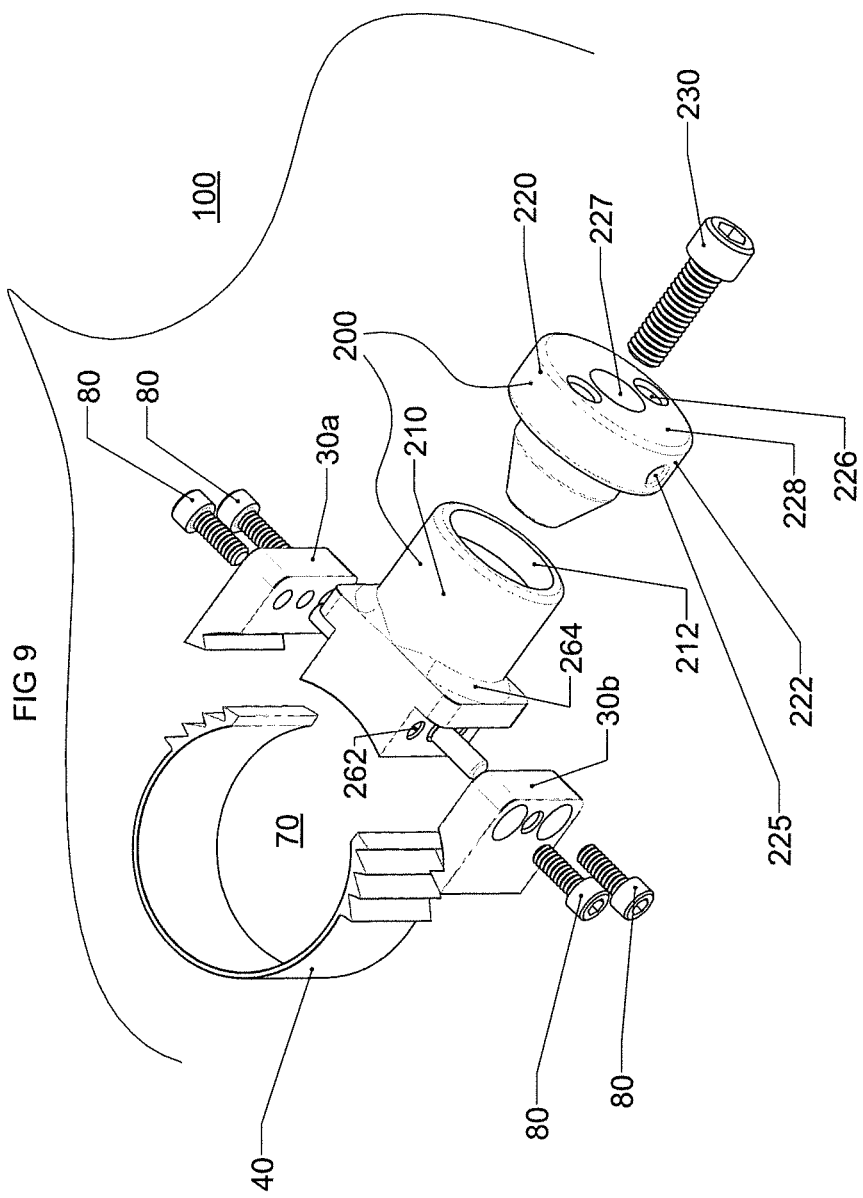
FIG. 9 is an exploded top perspective view of the clamp system of FIG. 8.

FIGS. 8-9 illustrate a clamp system 100 according to a second embodiment of the present invention. The clamp system 100 has a holder 200, a boss (boss pieces 30a and 30b) and a spring clamp 40. The boss pieces 30a and 30b and the spring clamp 40 can be identical to those in the clamp system 10.

The holder 200 is similar to the holder 20 in that the holder 200 also has a rear body 26 and its inner curved rear surface 28. Openings 262 extend through the rear body 26 so that bolts 80 can extend through the holes 32a, 32b in the bosses 30a and 30b and the openings 262 to secure the boss pieces 30a and 30b to the rear body 26. The difference between the holders 20 and 200 is that the first jaw 22 and the second jaw 24 are now replaced by a main body 210 and a mounting boss 220. The rear body 26 has a front plate 264 that defines a stepped shoulder 229 on either side of the rear body 26 such that the rear body 26 has a smaller width than the width of the front plate 264. When the boss pieces 30a, 30b are clamped against the rear body 26, the corresponding flat surfaces 21 and 38a, 38b still ensure a tight fit, with the shoulders 229 acting as stop surfaces.

The main body 210 extends transversely from the front plate 264 and is preferably cylindrical in configuration, having a receiving bore 212. The mounting boss 220 has a circular mounting piece 222 with a frusto-conical extension 224 extending rearwardly therefrom and adapted to be secured inside the receiving bore 212. Locking pin holes 225 can be provided on the circumferential surface of the mounting piece 222, and threaded holes 226 and a bolt hole 227 can be provided to extend from the front face 228 of the mounting piece 222. A bolt 230 can be extended through the bolt hole 227 and another hole 266 of the rear body 26 to secure the mounting boss 220 to the rear body 26.

Figure 10:
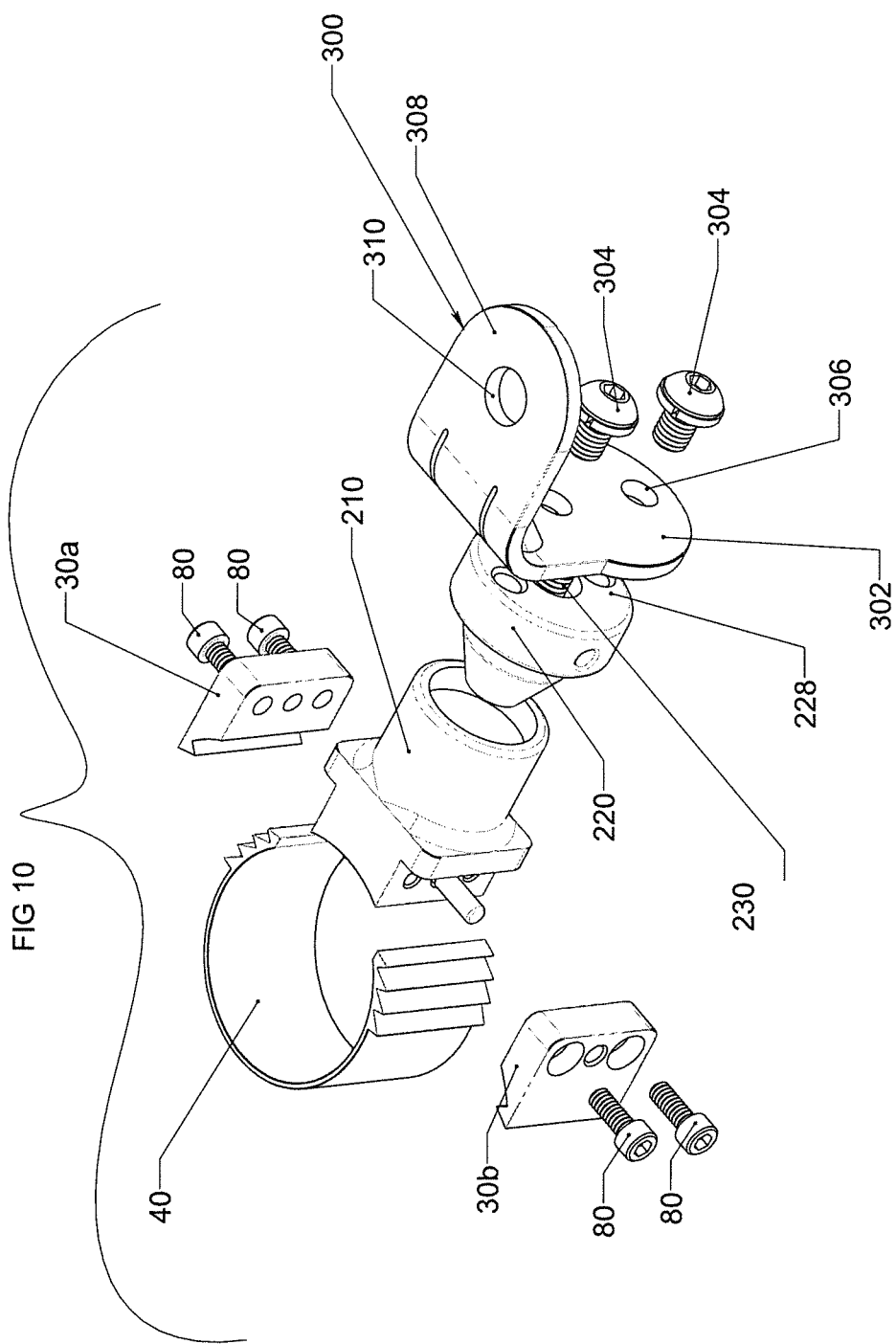
FIG. 10 is an exploded perspective view showing how a flag pole can be secured to the holder of FIG. 8.

The holder 200 can be used to secure a variety of different objects to a round tube 14. For example, FIG. 10 shows how a flag pole can be secured to the holder 200. A flag bracket 300 can be L-shaped with a first plate 302 that is secured to the front face 228 of the mounting piece 222 via bolts 304 that extend through openings 306 in the first plate 302 into the threaded holes 226. A second plate 308 is perpendicular to the first plate 302 and has a mounting hole 310 for receiving a flag (not shown).

Figure 11:
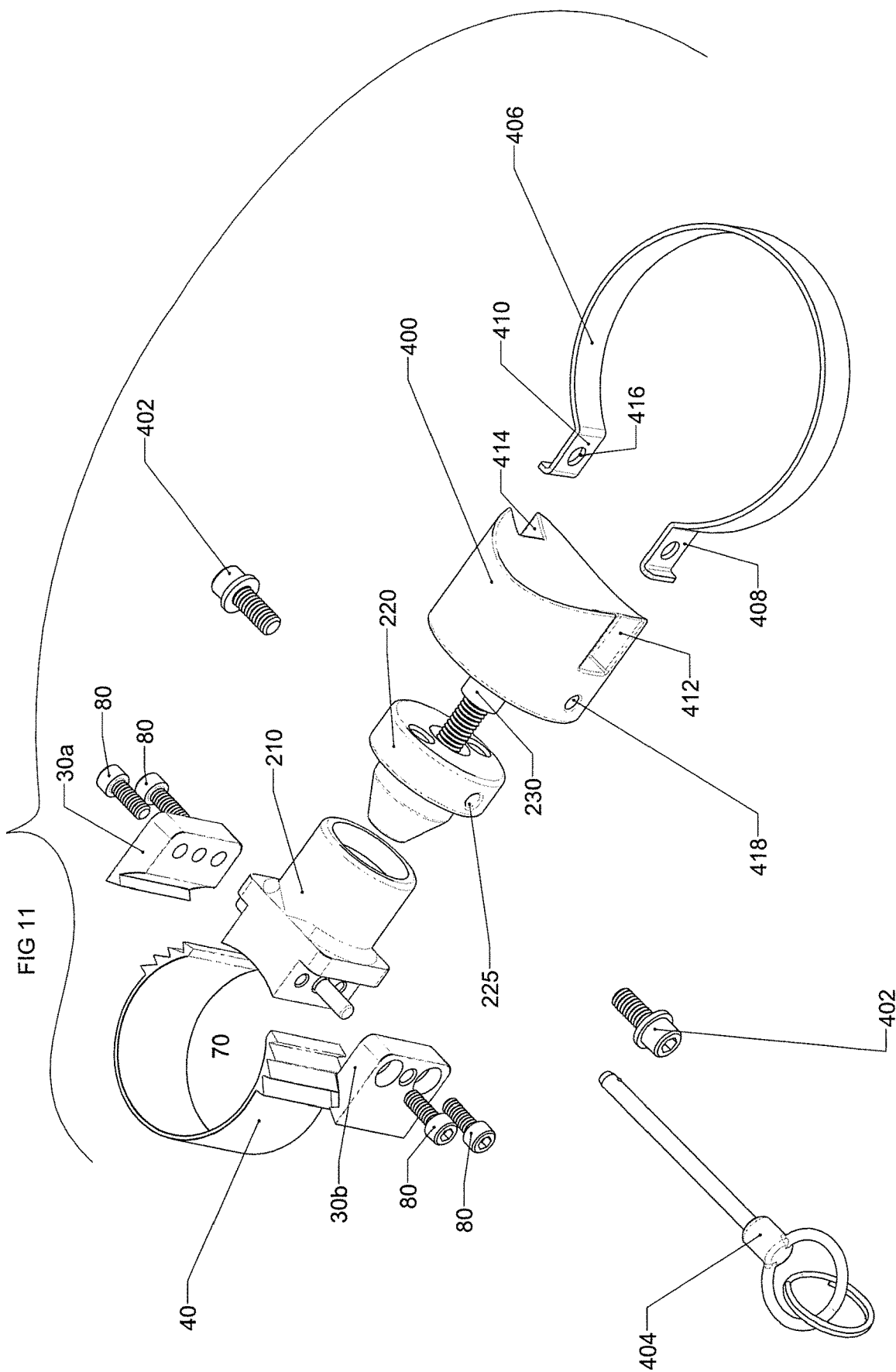
FIG. 11 is an exploded perspective view showing how a fire extinguisher can be secured to the holder of FIG. 8.

FIG. 11 shows how a fire extinguisher can be secured to the holder 200. A fire extinguisher block 400 has a hollow bore (not shown) that is adapted to receive the mounting boss 220. A C-shaped fire extinguisher clamp 406 (which holds the fire extinguisher—not shown) has opposite ears 408 and 410 that are adapted to be fitted into grooves 412 and 414, respectively, on the sides of fire extinguisher block 400. An opening 416 is provided in each ear 408 and 410. Clamp bolts 402 can be extended through the openings 416 and secured to the body of the fire extinguisher block 400 to secure the fire extinguisher clamp 406 to the fire extinguisher block 400. A locking pin 404 can be extended through a locking pin hole 418 in the side body of the fire extinguisher block 400, and through the locking pin hole 225, to secure the fire extinguisher block 400 to the mounting boss 220.

Figure 12:
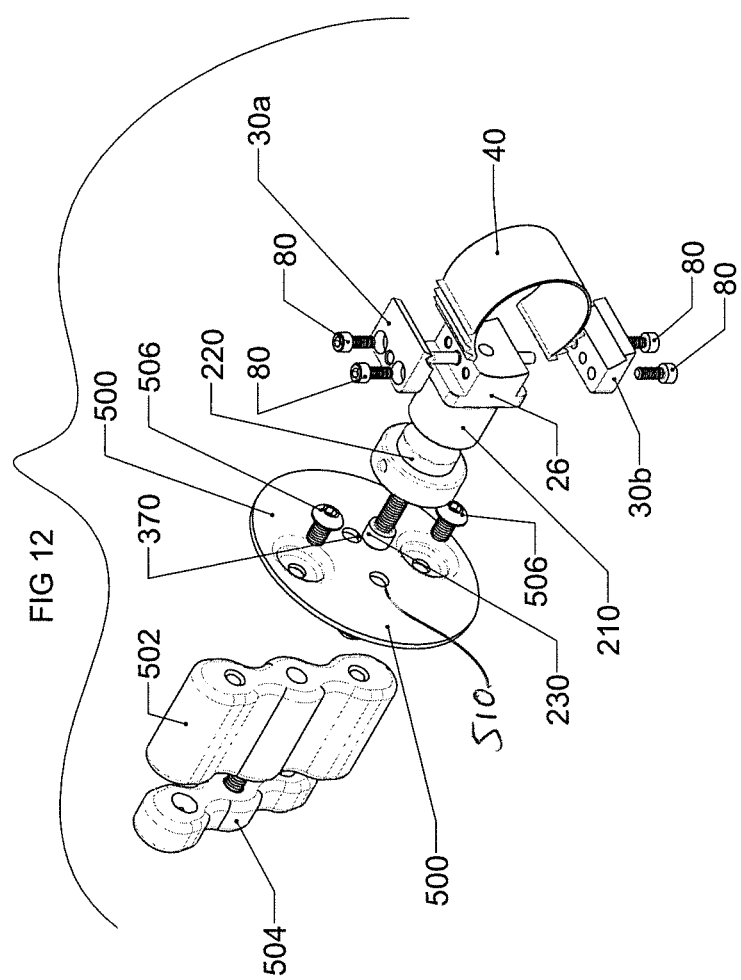
FIG. 12 is an exploded front perspective view showing how another mounting kit can be secured to the holder of FIG. 8.

FIGS. 12-13 show how another mounting kit can be secured to the holder 200. In FIGS. 12-13, the mounting kit is the mounting kit sold under the trademark ROTOPAX™, and which can be used to mount containers. This mounting kit has a mounting plate 500, a mounting block 502 and a tightening bolt 504 that comes standard when it is purchased from Rotopax Legacy LLC. The mounting plate 500 is the component that mounts to the mounting boss 220. The mounting plate 500 is mounted to the mounting block 502 via bolts 506 which are standard to the mounting kit. The mounting plate 500 is secured to the mounting boss 220 via bolts 508 that extend through openings 510 provided in the mounting plate 500, and then the bolts 508 are secured to the threaded holes 226 that are provided on the front face 228 of the mounting piece 222. Containers and other objects can then be mounted to the mounting kit.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A clamp system, comprising:
   a holder having a rear body with a curved rear surface that has opposite first and second ends, a first flat outer surface extending from the first end of the curved rear surface, and a second flat outer surface extending from the second end of the curved rear surface;
   a first boss piece and a second boss piece, each of the first boss piece and the second boss piece having a flat inner surface, and an outer edge with an angled slit that defines an inward grip edge, wherein the flat inner surface of the first boss piece clamps against the first flat outer surface of the rear body and the flat inner surface of the second boss piece clamps against the second flat outer surface of the rear body;
   a C-shaped spring clamp having a first end and an opposite second end, the first end of the C-shaped spring clamp having a first plurality of teeth and the second end of the C-shaped spring clamp having a second plurality of teeth; and
   wherein one tooth from the first plurality of teeth and one tooth from the second plurality of teeth define one set of engaging teeth which engage the corresponding angled slits from the first boss piece and the second boss piece.

2. The system of claim 1, wherein for each of the first boss piece and the second boss piece, a curved inner surface extends from the respective inward grip edge towards the respective flat inner surface.

3. The system of claim 1, wherein the first plurality of teeth and the second plurality of teeth face outwardly.

4. The system of claim 2, wherein a generally circular receiving space is defined by the C-shaped spring clamp, the curved inner surfaces of the first boss piece and the second boss piece, and the curved rear surface.

5. The system of claim 1, wherein bolts secure the first boss piece and the second boss piece to the rear body.

6. The system of claim 1, wherein the holder has a first jaw and a second jaw that are connected by the rear body to form a unitary generally C-shaped structure with a receiving space defined between the first jaw and the second jaw.

7. The system of claim 1, wherein the holder has a main body and a mounting boss, with the main body extending transversely from the rear body and having a receiving bore, and wherein the mounting boss has a circular mounting piece with a frusto-conical extension extending rearwardly therefrom and secured inside the receiving bore.

8. The system of claim 7, wherein locking pin holes can be provided on a circumferential surface of the mounting piece, and threaded holes extend from the mounting piece.

* * * * *